United States Patent [19]
Svochak

[11] Patent Number: 5,371,976
[45] Date of Patent: Dec. 13, 1994

[54] BIFOCAL CONTACT LENS AND METHOD OF MAKING SAME

[76] Inventor: Jan B. Svochak, 1001 W. Euless Blvd., #401, Euless, Tex. 76040

[21] Appl. No.: 74,951

[22] Filed: Jun. 10, 1993

Related U.S. Application Data

[62] Division of Ser. No. 786,060, Oct. 31, 1991, Pat. No. 5,245,366.

[51] Int. Cl.⁵ .............................................. B24B 1/00
[52] U.S. Cl. .............................................. 451/42; 451/57
[58] Field of Search ............ 51/281 R, 283 R, 284 R, 51/326, 327; 407/131

[56] References Cited

U.S. PATENT DOCUMENTS

| | | |
|---|---|---|
| 1,414,117 | 4/1922 | Drescher . |
| 3,279,878 | 10/1966 | Long . |
| 3,415,597 | 12/1968 | Harman . |
| 3,726,587 | 4/1973 | Kendall . |
| 3,973,838 | 8/1976 | Page . |
| 4,202,848 | 5/1980 | Neefe ........................ 51/284 R |
| 4,302,081 | 11/1981 | Tsuetaki . |
| 4,460,275 | 7/1984 | Spriggs ...................... 51/284 R |
| 4,618,229 | 10/1986 | Jacobstein et al. . |
| 4,693,572 | 9/1987 | Tsuetaki et al. . |
| 4,813,777 | 3/1989 | Rainville et al. . |
| 4,850,689 | 7/1989 | Martin et al. ............... 51/284 R |
| 4,854,089 | 8/1989 | Morals ........................ 51/284 R |
| 4,869,587 | 9/1989 | Breger . |
| 4,890,913 | 1/1990 | De Carle . |
| 4,923,296 | 5/1990 | Erickson . |
| 4,938,583 | 7/1990 | Miller ........................ 51/284 R |
| 4,938,583 | 7/1990 | Miller . |
| 4,971,432 | 11/1990 | Koeniger . |
| 5,017,000 | 5/1991 | Cohen . |
| 5,074,082 | 12/1991 | Cappelli ..................... 51/284 R |

*Primary Examiner*—Maurina T. Rachuba
*Attorney, Agent, or Firm*—Duke W. Yee; Andrew J. Dillon

[57] ABSTRACT

A bifocal contact lens is provided having a posterior surface that is formed to fit a human cornea and an anterior surface. The bifocal contact lens has an upper portion and a lower portion when viewed in a planar view. The anterior surface includes a distance vision surface and a near vision surface. The distance vision surface is substantially semicircular in form and located in the upper portion of the bifocal lens. A near vision surface is disposed within the lower portion of the bifocal contact lens and also surrounds the distance vision surface.

12 Claims, 2 Drawing Sheets

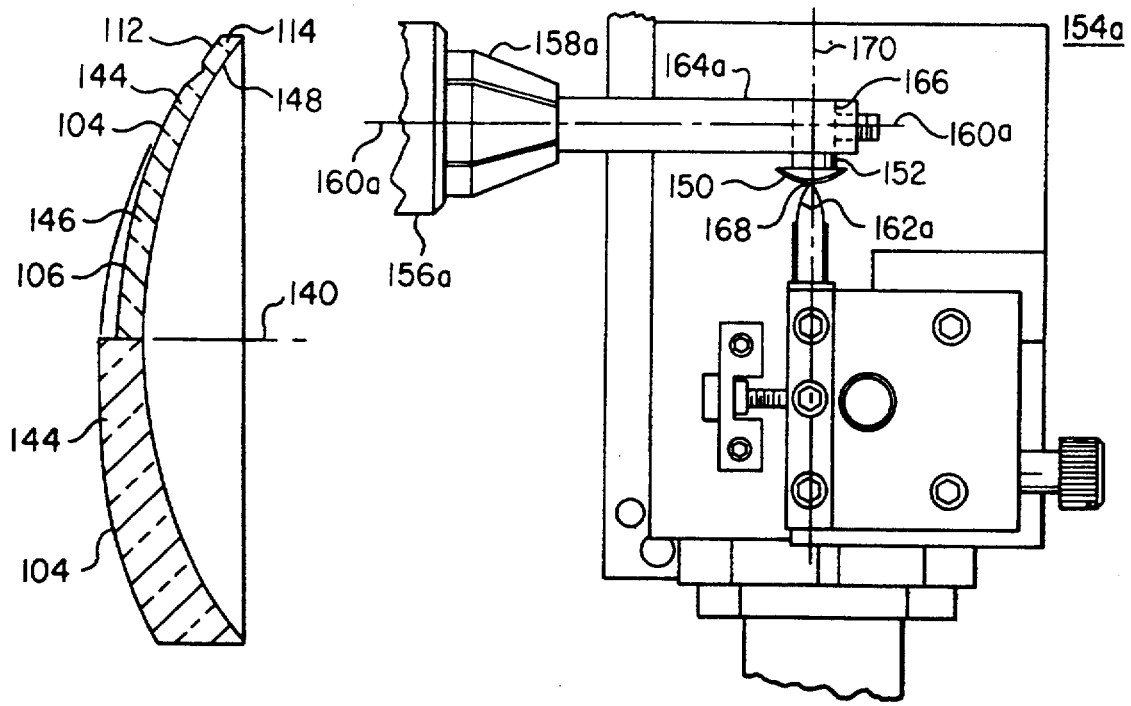
FIG. 7
FIG. 10
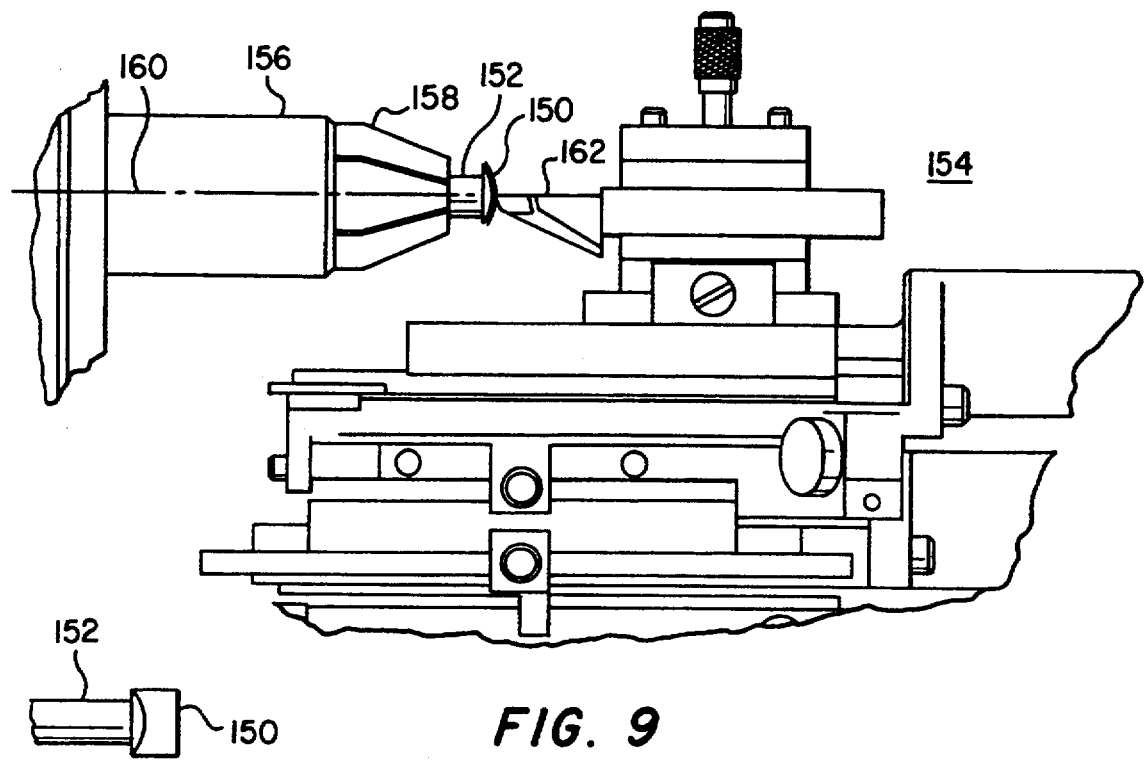
FIG. 8
FIG. 9

BIFOCAL CONTACT LENS AND METHOD OF MAKING SAME

This application is a division, of application Ser. No. 07/786,060, filed Oct. 31, 1991, now U.S. Pat. No. 5,245,366.

BACKGROUND OF THE INVENTION

1. Field of the Invention

The present invention relates generally to an improved bifocal contact lens and in particular to an improved single axis alternating vision bifocal contact lens. Still more particularly, the present invention provides an improved single axis alternating vision bifocal contact lens through a combination of distance vision and near vision sections.

2. Description of the Related Art

Contact lenses are now widely used for the correction of many different types of vision deficiencies. One deficiency is a condition occurs as a person ages—the lens of the eye begins to crystalize and lose its elasticity, eventually resulting in the eye losing the ability to focus on objects which are nearby. This condition is called presbyopia. A corrective lens to accommodate for the eye's weakness and properly focus light on the retina is needed in this condition.

One way to correct this problem is for a presbyopic person to wear reading glasses when it is desirable to see things nearby. Some people require both correction for near and far vision. In this situation, bifocal eye glasses have been prescribed for many years. These eye glasses correct for distance vision through one section of the lens and correct for near vision through a second section of the lens. Many people do not like to wear bifocal eye glasses and would prefer to wear contact lenses to correct their vision.

Bifocal contact lenses have been designed and manufactured in the industry for many years. Some designs involve a principle of simultaneous vision. For example, U.S. Pat. No. 4,923,926 teaches the utilization of a pair of corrective lenses whose surfaces are divided into a series of discrete near and distance vision zones whose dimensions and positions are such that, relative to the line of sight of the right and left eye respectively, each zone on one lens containing the distance power corresponds to a similar zone on the other lens containing a near power correction. These simultaneous vision or aspheric bifocal contact lenses have experienced some success, but are usually limited to early presbyopic or low add powers. Problems still exist, however, in providing presbyopic patients with a bifocal contact lens which successfully provides correction for both near and distance vision.

U.S. Pat. No. 4,869,587 discloses a multifocal contact lens of the concentric simultaneous vision type. That is, the lens includes a prism ballast at a lower edge such that the center of the near portion of lens is offset below the center of the wearer's pupil, leaving a crescent-shaped portion of the pupil covered by the distance portion rather than the near portion of the contact lens. A prism or prism shape is produced during manufacturing of a lens by making the lens thicker, and thus, heavier, at the lower portion of the lens. Thus, ballast or prism ballast is accomplished. This type of lens involves some blurring of images since light always passes through a portion of the lens that is out of focus.

Another type of bifocal contact lens is based on the alternating vision principle. "Alternating vision" is a term utilized to describe a bifocal contact lens which contains a distance vision section in the upper portion of the lens and a near vision section in the lower portion of the lens. One type of alternating vision lens is an annular type disclosed in U.S. Pat. No. 4,971,432, involving a distance vision section concentric with a near vision section. Another is a crescent segmented bifocal contact lens such as that disclosed in U.S. Pat. No. 4,928,583 as having a distance portion above and a crescent shaped portion immediately below the distance portion.

U.S. Pat. No. 4,693,572 teaches a bifocal contact lens divided into a distance vision segment in the upper part of the lens and a near vision segment in the lower portion of the lens. This lens is manufactured by removing weight from the bottom portion of the lens and, thus, requires the lens to be much thicker when prism is desired.

Although many bifocal contact lens designs exist, the monovision system of contact lenses presently remains the most prescribed form of fitting presbyopic patients in contact lenses. This monovision system requires fitting a distance power lens in one eye and a near vision power lens in the other eye. Moreover, monovision also compromises a patient's ability to retain depth perception and has a low success rate. The prevalence of the monovision system is an indication that many improvements are still needed in the bifocal contact lens field.

Additionally, with the increasing use of computers, more and more people utilize a computer at work and at home. An ability to have near vision when glancing up at a video display screen is helpful in addition to the near vision utilized while looking downward. Moreover, situations exist in which near vision is desired when looking side to side. For example, a car driver may wish to glance to one side to find controls or read instruments in a car. Presently, alternating vision bifocal contact lenses provide distance vision when looking up or straight ahead and near vision when looking downward, but near vision is not supported for glancing up from a desk or side to side to read controls or instruments.

Further, many translating bifocal contact lenses require large amounts of prism, or added weight to keep the lens oriented on the eye so that the near vision segment or section of the lens positions on the lower half of the eye. Added prism ballast results in a lens that is thicker and thus more uncomfortable on a wearer's eye than lenses either not containing prism or containing lesser amounts of prism.

Consequently, it would be desirable to have a bifocal contact lens that provides near vision when glancing upward and side to side in addition to the normal downward reading and provides greater comfort to the wearer than previously known bifocal contact lenses.

SUMMARY OF THE INVENTION

It is therefore one object of the present invention to provide an improved bifocal contact lens.

It is yet another object of the present invention to provide an improved single axis alternating vision bifocal contact lens.

It is still another object of the present invention to provide an improved single axis alternating vision bifocal contact lens through a combination of distance vision and near vision sections.

It is a further object of the present invention to provide an improved single axis alternating vision bifocal contact lens which provides more comfort for the wearer.

The foregoing objects are achieved as is now described. In accordance with the apparatus of the present invention, a bifocal contact lens is provided having a posterior surface that is formed to fit a human cornea. The bifocal contact lens has an upper portion and a lower portion when viewed in a planar view. The anterior surface of the lens has distance and near vision surfaces. The distance vision surface is substantially semicircular in form and disposed in the upper portion of the contact bifocal lens. A first near vision surface is disposed within the lower portion of the lens. A second near vision surface surrounds the distance vision surface in the upper portion of the lens.

The present invention also includes a method for making a bifocal contact lens from a lens blank. The lens blank includes an anterior surface and a posterior surface and a upper portion and a lower portion in a planar view. A near vision surface is formed or cut on the anterior surface with the near vision surface having a first radius of curvature. Next, a distance vision surface is formed on the anterior surface in approximately the upper portion of the lens blank in a generally semicircular shape wherein the distance vision surface is surrounded by the near vision surface. The near distance surface has a second radius of curvature wherein the second radius of curvature is smaller than the first radius of curvature.

The above as well as additional objects, features, and advantages of the present invention will become apparent in the following detailed description.

BRIEF DESCRIPTION OF THE DRAWINGS

The novel features believed characteristic of the invention are set forth in the appended claims. The invention itself however, as well as a preferred mode of use, further objects and advantages thereof, will be best understood by reference to the following detail description of an illustrative embodiment when read in conjunction with the accompanying drawings, wherein:

FIG. 7 depicts a sectional view of a bifocal contact lens with a preferred embodiment of a lenticular section in accordance with a preferred embodiment of the present invention;

FIG. 8 is a side view of a contact lens holder and a contact lens blank;

FIG. 9 depicts a partial side view of a lathe illustrating the cutting of a distance segment in accordance with a preferred embodiment of the present invention; and FIG. 10 is a partial top view of a lathe illustrating the cutting of a near vision segment in accordance a preferred embodiment of the present invention.

DETAILED DESCRIPTION OF PREFERRED EMBODIMENT

Figure 1:
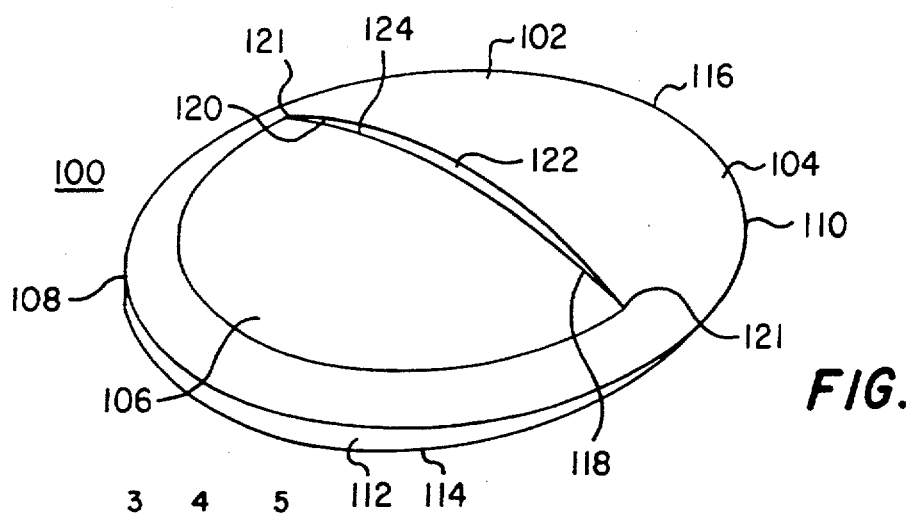
FIG. 1 depicts an isometric view of a bifocal contact lens having a lenticular section which is manufactured in accordance with a preferred embodiment of the present invention.

With reference now to the Figures, and in particular with reference to FIG. 1, there is depicted an isometric view of a bifocal contact lens having a lenticular section in accordance with a preferred embodiment of the present invention. As may be seen, lens 100 includes an anterior surface 102 which contains a near vision surface 104, surrounding a distance vision surface 106.

In particular, distance vision surface 106 is located in a upper portion 10S of lens 100 and near vision surface 104 is located in a lower portion 110 of lens 100 and extends around distance vision surface 106 in upper portion 108 of lens 100. Anterior surface 102 also includes a front lenticular surface 112. Front lenticular surface 112 is part of a lenticular section 114 of lens 100. Lens 100 also includes radial edge 116. Lenticular section 114 is utilized under a preferred embodiment of the present invention to allow lens 100 to be thinner and reduce the mass of lens 100 than otherwise would be possible without lenticular section 114.

Lenticular section 114 is preferably formed by changing the front radius of curvature of lens 100 in the outer portion of the lens or peripheral portion in order to maintain consistent edge thickness and/or reduce thickness or mass of the lens. Lenticular section 114 of lens 100 contains a base curve and a peripheral curve. Lenticulation allows lens 100 in a preferred embodiment of the present invention, to be greatly reduced in mass and contributes strongly to eye comfort in the wearer of the lens.

Near vision surface 114 and distance vision surface 106 meet at a line 118, which divides lens 100 into upper portion 108 and a lower portion 110. Also at line 118, a shelf surface 120 having opposing ends 121 is formed by the meeting of near vision surface 104 and distance vision surface 106. Shelf surface 120 is formed between an upper edge 122 of near vision surface 104 and a lower edge 124 of distance vision surface 106. That is, shelf surface 120 is formed by an offset between upper edge 122 of near vision surface 104 and lower edge 124 of distance vision surface 106 along line 118, the line along which these two surfaces meet. Shelf surface 120 extends along line 118 and extends perpendicularly to at least one of the two surfaces. In actual use, shelf surface 120 faces an upper lid of a wearer.

Figures 2, 4, 5:
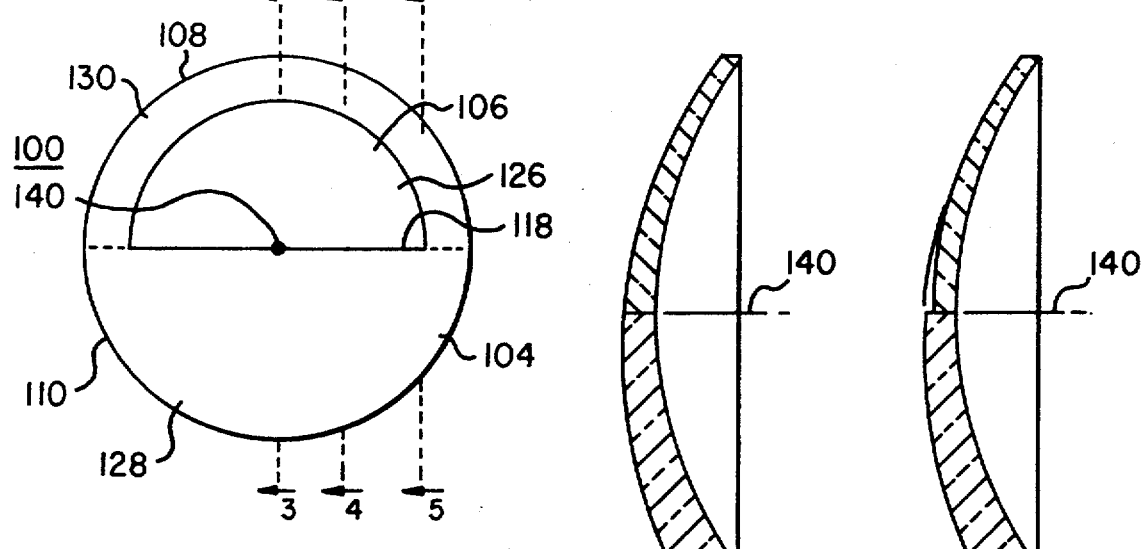
FIG. 2 is a front view of a bifocal contact lens which is manufactured in accordance with a preferred embodiment of the present invention.
FIG. 4 is a vertical sectional view of the bifocal contact lens depicted in FIG. 2 taken along line 4—4 of FIG. 2.
FIG. 5 depicts a vertical sectional view of the bifocal contact lens depicted in FIG. 2 taken along line 5—5 of FIG. 2.

FIG. 2 is a front view of a bifocal contact lens 100 which is manufactured in accordance with a preferred embodiment the present invention. To reduce the complexity of the description of this Figure and others, those portions of the embodiments of the present invention which are substantially similar to the portions illustrated in FIG. 1 will be referred to utilizing the same reference numerals. Lens 100 includes line 118 which generally divides lens 100 into upper portion 108 and lower portion 110. Lower portion 110 of lens 100 forms first zone 126 which contains near vision surface 104. Upper portion 108 contains both near vision surface 104 and distance vision surface 106. A second zone 128 is formed by distance vision surface 106 in upper portion 108 of lens 100 and a third zone 130, in the form of an annular semicircular segment around second zone 128, meets first zone 126 along line 118.

Figure 3:
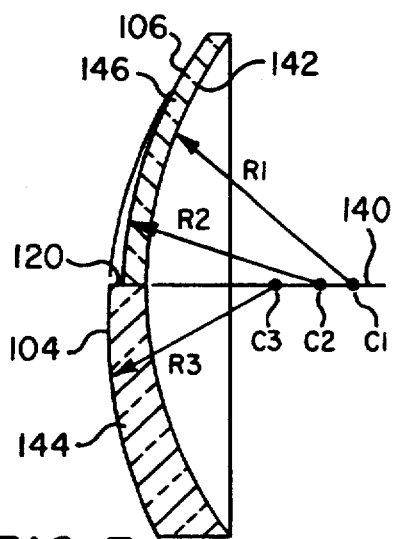
FIG. 3 depicts a vertical sectional view of the bifocal contact lens depicted in FIG. 2, taken along line 3—3 of FIG. 2.

Referring again to FIG. 1, shelf surface 120 is greatest in width at or near the geometric center of lens 100 and decreases in width as radial edge 116 of lens 100 is approached until shelf surface 120 become nonexistent near ends 121 of shelf surface 120. FIG. 3–5 illustrate the change in the width of shelf surface 120 as ends 121 of shelf surface are approached, under a preferred embodiment of the present invention.

It should also be apparent from FIG. 1 and FIGS. 3–5 that proximate to opposing ends 121 of shelf surface 120, near vision surface 104 and distance vision surface 106 meet at a tangent, without an offset between the surfaces. Thus no shelf surface 120 is formed since these surfaces meet or are tangent to each other at a single point, and are nearly tangent at closely adjacent points. This decreasing of shelf surface width towards radial edge 116 has an advantage of improving eye comfort on the wearer a lens under a preferred embodiment of the present invention.

A bifocal lens under a preferred embodiment of the present invention should have the upper and lower portions of the lens proportioned such line 118 lies substantially at the lower portion of the wearer's pupil in actual use.

FIG. 3 depicts a vertical sectional view of the bifocal lens in FIG. 2 taken along line 3—3 of FIG. 2 under a preferred embodiment of the present invention. Lens 100 in this vertical sectional view is depicted having an optical axis line 140 where all centers of curvatures C-1, C-2 and C-3 lie along optical axis line 140.

Rear surface 142 is formed on a radius R-1 with rear surface 142 having a center of curvature C-1. Near vision segment 144 contains near vision surface 104, having a radius of curvature R-2 and a center of curvature C-2. Distance vision segment 146 has distance vision surface 106 which has a radius of curvature R-3 and a center of curvature C-3. Although this particular embodiment of the present invention is shown as being a "monocentric" lens, this particular feature is not essential to the present invention and is described only for purposes of illustration of a preferred embodiment of the present invention.

A bifocal contact lens constructed in accordance with the present invention may be a "single axis" lens, which is a lens having both the distance vision section and the near vision section made with the same prism.

Figure 6:
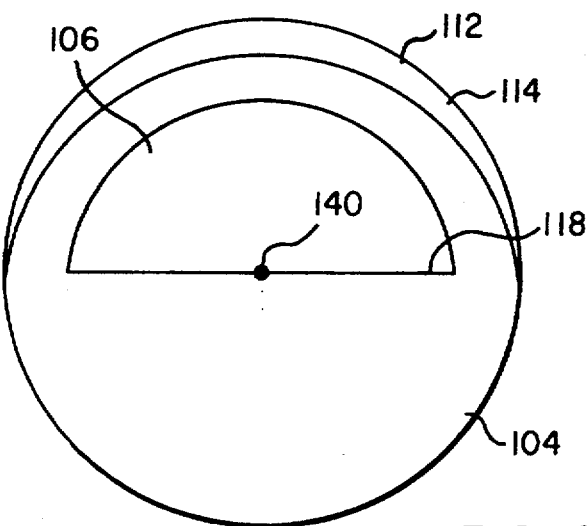
FIG. 6 is a front view of a bifocal contact lens which is manufactured in accordance with a preferred embodiment of the present invention.

FIG. 6 is a front view of a bifocal contact lens which includes a lenticular section 114 in accordance with a preferred embodiment of the present invention. FIG. 6 is a front view of the lens of FIG. 1. As depicted, distance vision surface 106 is substantially the shape of a semicircle which is located in upper portion 108 of lens 100, encompassed by near vision surface 104 and forming a shelf surface along line 118 where near vision surface 104 and distance vision surface 116 meet. Lenticular section 114 is located in upper portion 108 of lens 100 along radial edge 116.

FIG. 7 depicts a vertical sectional view of the bifocal contact lens of FIG. 6. Lenticular section 114 has a front lenticular surface 112 and a rear lenticular surface 148.

The contact lens of the present invention is a translating or single axis alternating vision bifocal lens design. The bifocal lens in a preferred embodiment of the present invention includes a near vision lens with a distance segment cut on the upper portion of the lens, permitting distance viewing only when distance viewing is necessary; i.e., looking straight ahead. In addition, removing weight from the top portion of the bifocal lens also contributes to eye comfort, but more importantly makes the lens "bottom heavy" which aids greatly in lens orientation. A "bottom heavy" lens requires less prism ballast and/or weight for adequate lens orientation and even further contributes to lens comfort on the eye of the wearer.

Referring to FIG. 8, there is illustrated a side view of a lens blank 150 shown mounted on a lens holder 152, prior to forming the anterior surface of a bifocal contact lens in accordance with a preferred embodiment of the present invention.

Referring to FIG. 9, there is depicted a partial side view of a double compound lathe illustrating the cutting of a distance vision segment in accordance with a preferred embodiment of the preferred embodiment of the present invention. A back surface is first cut into a lens blank 150. Next, lens blank 150 is mounted on lens holder 152 with a pitch or adhesive. Lathe 154 contains a rotating spindle 156 with collet 158 for holding lens holder 152 in place during the forming of the front lens surfaces. Lens blank 150 is rotated about an axis line 160 and cutting tool 162 is manipulated to form a near vision surface and an optical axis coincident with axis line 160, in a first series of passes.

With reference to FIG. 10 there is depicted is a partial top view of a single compound lathe showing the cutting of a near vision segment in accordance with a preferred embodiment of the present invention. Lens holder 152 is removed from collet 158 and placed into a rod 164a located on collet 158a with the center hole 166 of rod 164a lined up with the cutting tool 162a perpendicular to the axis 160a. The optical axis of lens blank 150 is perpendicular to axis line 160a. The radius of curvature is set by the distance between tip 168 of cutting tool 162a and the point at which axis 160a cross aligning axis 170. The radius of curvature can be adjusted by changing the distance of tip 168 of cutting tool 162a in relation to the point defined by the intersection of axis 160a and aligning axis 170. Lens holder 152 is moved such that lens blank 150 meets tip 168 in order to position lens blank 150 for a second series of passes to cut the radius for the distance vision section. Next, lens blank 150 is rotated such that the optical axis of lens 150 is perpendicular to axis 160a and a second series of passes are made utilizing cutting tool 162a to form a distance vision surface in a semicircular shape located centrally in an upper portion of the lens.

In accordance with a preferred embodiment of the present invention, a bifocal lens may be produced as a rigid gas permeable lens, a soft contact lens, or some other form of plastic contact lens.

One advantage of a bifocal contact lens manufactured in accordance with the present invention is that the decrease in the width of the shelf surface as the radial edges of the lens are approached aids in increasing comfort to the wearer of the lens. Furthermore, the location of the distance vision segment of the lens in relation to the near vision segment of the lens allows for a wearer of the lens to glance upward or side to side and have near vision capability.

Another advantage of the bifocal contact lens of the present invention is that the inherent "bottom heaviness" caused by cutting the distance vision segment on the upper portion of the lens, in addition to other near vision benefits, decreases the mass from the upper portion of the lens. Thus, the lens is "bottom heavy" without adding unwanted prism.

In addition, it will be noted that other modifications may be made without departing from the present invention. For example, the bottom portion of the lens may be cut off or truncated to aid in lid engaging action for lens translation.

The description of the preferred embodiments of the present invention has been presented for purposes of illustration and description, but is not intended to be exhaustive or limit the invention in the precise form disclosed. Many modifications and variations will be apparent to practitioners skilled in the art. The embodiment was chosen and described in order to best explain the principles of the invention and the practical application to enable others skilled in the art to understand the invention for various embodiments and with various modifications as are suited for the particular use contemplated.

What is claimed is:

1. A method for making a bifocal contact lens from a lens blank having an anterior surface and a posterior surface and a upper portion and a lower portion in a planar view, said method comprising:
   forming a near vision surface on said anterior surface, said near vision surface having a first radius of curvature; and
   forming a distance vision surface on said anterior surface in approximately said upper portion of said of said lens blank in a generally semicircular shape wherein said distance vision surface is surrounded by said near vision surface, said distance vision surface having a second radius of curvature, said second radius of curvature being larger than said first radius of curvature and wherein a center of curvature for said first radius of curvature, a center of curvature for said second radius of curvature, and a center for said radius of curvature for said posterior surface are located at points along a single axis.

2. A method for making a bifocal contact lens which comprises the steps of:
   providing a lens blank having a concave posterior surface shaped in conformity with a human cornea to define an optical axis and an anterior surface and having an upper portion and a lower portion in a planar view;
   rotating said lens blank about an axis of rotation substantially coincidental with said optical axis as defined by said posterior surface;
   cutting a first convex surface to form a near vision surface on said anterior surface of said lens blank, said near vision surface having a first radius of curvature, wherein said first convex surface substantially covers said anterior surface;
   positioning said lens blank such that said optical axis is substantially perpendicular to said axis of rotation; and
   cutting a second convex surface to form a distance vision surface on said anterior surface of said lens blank, said distance vision surface having a second radius of curvature, said second radius of curvature being larger than said first radius of curvature, wherein said distance vision surface, when viewed in a planar view, is substantially semicircular in shape, located generally centrally in a portion of said upper portion of said lens blank, and surrounded by said near vision surface and wherein said first radius of curvature has a center of curvature located at a first point along an axis substantially coincidental with said optical axis as defined by said posterior surface and said second radius of curvature has a center of curvature located at a second point along said axis substantially coincidental with said optical axis as defined by said posterior surface.

3. The method of claim 2, wherein said cutting a second convex surface causes said portion entirely cover said upper portion of said lens blank.

4. The method of claim 2, wherein cutting a first convex surface causes said first radius of curvature to have center of curvature on said optical axis and wherein said step of cutting a second convex lens causes said second radius of curvature to have a center of curvature on said optical axis.

5. The method of claim 1, wherein said step of forming a near vision surface having a first radius of curvature and said step of forming a distance vision surface having a second radius of curvature includes forming said surfaces such that said first radius of curvature has a first center of curvature on an optical axis and said second radius of curvature has a first center of curvature on the optical axis.

6. A method for making a single optical axis bifocal contact lens from a lens blank having an anterior surface and a posterior surface and an upper portion and a lower portion in a planar view, said method comprising:
   forming a near vision surface on said anterior surface, said near vision surface having a first radius of curvature having a first center of curvature on an optical axis; and
   forming a distance vision surface on said anterior surface in approximately said upper portion of said of said lens blank, said distance vision surface having a second radius of curvature having a second center of curvature on said optical axis, said second radius of curvature being larger than said first radius of curvature, wherein said first near vision surface meets said distance vision surface at an offset, forming a offset surface, said offset surface facing an upper lid of a wearer in actual use and wherein said bifocal contact lens is a monocentric lens.

7. A method for making a single optical axis bifocal contact lens from a lens blank having an anterior surface and a posterior surface and an upper portion and a lower portion in a planar view, said method comprising:
   forming a near vision surface on said anterior surface, said near vision surface having a first radius of curvature having a first center of curvature on an optical axis; and
   forming a distance vision surface on said anterior surface in approximately said upper portion of said of said lens blank, said distance vision surface having a second radius of curvature having a second center of curvature on said optical axis, said second radius of curvature being larger than said first radius of curvature, wherein said first near vision surface meets said distance vision surface at an offset, forming a offset surface, said offset surface facing an upper lid of a wearer in actual use and wherein said single axis bifocal contact lens is a monocentric lens,
   wherein said step of forming a near vision surface and said step of forming a distance vision surface, forms an offset surface that is substantially horizontal during use of said single optical axis bifocal contact lens.

8. The method of claim 16 wherein said step of forming a near vision surface and said step of forming a distance vision surface, forms an offset surface that has opposing ends and said offset surface decreases in width as said offset surface approaches said opposing ends.

9. The method of claim 6, wherein said step of forming said distance surface produces a distance surface that covers all of said upper portion.

10. The method of claim 6, wherein forming steps are performed on a lens blank for a soft bifocal contact lens.

11. The method of claim 6, wherein forming steps are performed on a lens blank for a hard bifocal contact lens.

12. The method of 6, wherein said upper portion includes a radial edge and further comprises forming a lenticular section along said radial edge of said upper portion.

* * * * *